(12) United States Patent
Hensel et al.

(10) Patent No.: US 12,082,743 B2
(45) Date of Patent: Sep. 10, 2024

(54) GRINDER, COFFEE MACHINE AND METHOD FOR GRINDING COFFEE BEANS

(71) Applicant: MELITTA PROFESSIONAL COFFEE SOLUTIONS GMBH & CO. KG, Minden (DE)

(72) Inventors: Armin Hensel, Rahden (DE); Bernd Buchholz, Rahden (DE); Dirk Meyer, Porta Westfalica (DE)

(73) Assignee: MELITTA PROFESSIONAL COFFEE SOLUTIONS GMBH & CO. KG, Minden (DE)

( * ) Notice: Subject to any disclaimer, the term of this patent is extended or adjusted under 35 U.S.C. 154(b) by 817 days.

(21) Appl. No.: 16/972,338

(22) PCT Filed: Jun. 27, 2019

(86) PCT No.: PCT/EP2019/067132
§ 371 (c)(1),
(2) Date: Dec. 4, 2020

(87) PCT Pub. No.: WO2020/002493
PCT Pub. Date: Jan. 2, 2020

(65) Prior Publication Data
US 2021/0235934 A1  Aug. 5, 2021

(30) Foreign Application Priority Data
Jun. 29, 2018 (DE) ..................... 10 2018 115 735.5

(51) Int. Cl.
*A47J 42/18* (2006.01)
*A23F 5/08* (2006.01)
(Continued)

(52) U.S. Cl.
CPC .................. *A47J 42/18* (2013.01); *A23F 5/08* (2013.01); *A47J 31/42* (2013.01); *A47J 31/5251* (2018.08);
(Continued)

(58) Field of Classification Search
CPC ............ A47J 42/18; A47J 42/16; A47J 42/20; A47J 42/44; A47J 42/46; A47J 42/08; A47J 31/42; A47J 2202/00; B02C 25/00
See application file for complete search history.

(56) References Cited

U.S. PATENT DOCUMENTS

2012/0228418 A1   9/2012   Mazzer

FOREIGN PATENT DOCUMENTS

| CN | 201676715 U | 12/2010 |
|---|---|---|
| DE | 1607532 B1 | 4/1972 |
| DE | 3503010 C2 | 4/1988 |

(Continued)

OTHER PUBLICATIONS

English translate (FR560932A), retrieved date Nov. 8, 2023.*
Chinese Office Action in corresponding Chinese Patent Application No. 2020-570108, mailed Mar. 7, 2020, 8 pages with English Machine Translation by Google.
(Continued)

*Primary Examiner* — Mohammed S. Alawadi
(74) *Attorney, Agent, or Firm* — FisherBroyles, LLP; Robert Kinberg (57) ABSTRACT

The invention relates to a grinder for grinding coffee beans. The grinder has a first grinding tool and a second grinding tool which form a grinding gap and are rotatable relative to each other to grind coffee beans in the gap. A force generation device is arranged for applying a force, which is adjustable during operation, to one or both of the first grinding tool and second grinding tool, which force is
(Continued)

transferrable to the coffee beans. The invention also relates to a method for grinding coffee beans with the grinder for preparing a hot beverage.

22 Claims, 5 Drawing Sheets

(51) Int. Cl.
  *A47J 31/42* (2006.01)
  *A47J 31/52* (2006.01)
  *A47J 42/08* (2006.01)
  *A47J 42/16* (2006.01)
  *A47J 42/20* (2006.01)
  *A47J 42/44* (2006.01)
  *A47J 42/46* (2006.01)
  *B02C 25/00* (2006.01)
(52) U.S. Cl.
  CPC ............... *A47J 42/16* (2013.01); *A47J 42/20* (2013.01); *A47J 42/44* (2013.01); *A47J 42/46* (2013.01); *B02C 25/00* (2013.01); *A47J 2202/00* (2013.01)

(56) References Cited

FOREIGN PATENT DOCUMENTS

| EP | 2286699 | B1 | | 2/2011 | |
|---|---|---|---|---|---|
| EP | 3108776 | A1 | | 12/2016 | |
| FR | 560932 | A | * | 10/1923 | |
| FR | 560932 | A | | 10/1923 | |
| JP | 2018094188 | A | | 6/2018 | |
| WO | 2015143677 | A1 | | 10/2015 | |
| WO | WO-2015143677 | A1 | * | 10/2015 | .......... A47J 31/4425 |

OTHER PUBLICATIONS

International Search Report in corresponding International Patent Application No. PCT/EP2019/067132, mailed on Oct. 28, 2019, 20 pages with Google English Translation.

German Search Report in corresponding German Patent Application No. 102018115735.5, dated on Oct. 2, 2018, 15 pages with Google English Translation.

* cited by examiner

GRINDER, COFFEE MACHINE AND METHOD FOR GRINDING COFFEE BEANS

CROSS-REFERENCE TO RELATED APPLICATIONS

This application is a United States National Stage Application of International Application No. PCT/EP2019/067132 filed Jun. 27, 2019, claiming priority from German Patent Application No. 10 2018 115 735.5 filed Jun. 29, 2018.

FIELD OF THE INVENTION

The invention relates to a grinder for grinding coffee beans, to a method for grinding coffee beans and to a coffee machine, in particular a fully automatic coffee machine.

BACKGROUND

The appropriate fineness of a coffee powder is a prerequisite for successful coffee preparation. It determines the speed at which the water can flow through the coffee powder and the time period during which aromas and flavors can be released from the coffee powder. This time is called extraction time and it is a quality criterion for the appropriate extraction of the flavors and aromas of the respective coffee beverage.

The extraction intensity of a coffee beverage is decisively influenced by the grinding degree of the ground coffee, in addition to contact pressure, water temperature, water quality and bean properties. The grinding degree describes the fineness with which the bean is ground. The grinding process of coffee beans produces a fineness distribution, i.e. not all coffee particles have the same size but are subject to a particle size distribution typical for coffee. The median X50 [μm] of the fineness distribution is a proven measurement for assessing the fineness of the ground coffee. It denotes the value of the particle size that lies in the middle of the quantity distribution (e.g. an idealized ball diameter for measuring instruments with laser diffraction principle). This means that one half of all particles is smaller, and the other half is larger than the median.

The finer a grind, the larger the total particle surface area and thus the contact time of the water with the coffee powder. A balanced ratio between aroma and strength is achieved when approximately 18 to 22% of the aromatic substances are dissolved from the coffee. The optimal contact time for espresso preparation is in the range of 25-30 s and for filter coffee several minutes. Under-extraction leads to a too acidic and over-extraction to a too bitter coffee taste. The appropriate grinding degree of espresso powder is at a median of maximum 350 μm, that of café creme at 550 μm and that of filter grinding at 700 μm.

The grinding degree of the coffee powder can usually be adjusted in coffee machines with a grinder. High-quality machines even allow infinitely variable adjustment of the grinder and compensate for undesirable boundary conditions (e.g. thermal expansion, grinding disc wear, etc.) by readjusting the grinder components. Some systems use the extraction time of the coffee beverage as an indirect feature to check the appropriate setting of the grinding degree.

For the preparation of a high-quality coffee beverage, the appropriate and product-related setting of the grinding degree plays a major role.

Two main proven designs of coffee grinders are known which are used in coffee machines. On the one hand, disc grinders and on the other hand cone grinders. Both types of grinders have in common that they consist of two grinding tools, wherein one of these tools is fixed and the other is driven. As a result of the rotational movement of the one grinding tool, the beans are drawn into a grinding gap and are ground ever finer via the tapering grinding gap width. The smallest distance between the two grinding tools is decisive for the produced grinding degree of the coffee powder. To change the grinding degree, the fixed tool can be adjusted relative to the rotating tool so that the distance is varied. These systems are geometry-based methods for changing the grinding degree.

According to the technical teachings of EP 2 286 699 B1, it is provided that the grinder for a coffee machine has a first grinding disc that can be driven about an axis of rotation by a drive means and a second grinding disc. The second grinding disc is fixed in a screw-in part which can be screwed into a housing and can be rotated relative to the housing by adjusting means. Thus, a grinding gap between the two grinding discs can be adjusted. The adjusting means are designed coaxially to the screw-in part, which interacts with an adjusting wheel that can be rotated by adjusting means. The grinder also has a feed opening for feeding the coffee beans to be ground and a discharge opening for discharging the coffee ground between the two grinding discs. For adjusting the grinding gap, the grinder has a central adjustment facility which is infinitely variable.

An existing problem of these grinder systems is the determination of a zero point at which a minimum degree of fineness can be defined. Only if this is successful, a grinding degree suitable for the product can be set directly and precisely in relation to this zero point. A prerequisite for this is particularly high manufacturing accuracy in the overall design of the grinder (e.g. high axial run-out accuracy in the disc grinder).

Furthermore, in conventional coffee grinders, disturbing influences such as thermal expansion of the grinder components, grinding disc wear, bean change, etc. can only be compensated indirectly (e.g. by evaluating the extraction time). Heat influences in particular lead to varying grinding degrees and different swelling behavior of the coffee powder in the brewing unit and are thus the main cause of fluctuating run-down times.

As a result of these facts, long adjustment cycles are often required to ideally adjust the grinder of a coffee machine to the desired product and taste profile. Furthermore, the grinding degree can usually only be set and adjusted for a specific product.

SUMMARY

An object of the invention therefore is to further develop a generic grinder in a functionally advantageous manner.

According to an embodiment of the invention, a grinder for grinding coffee beans comprises a first grinding tool and a second grinding tool forming a grinding gap, wherein the second grinding tool is rotatable or is rotated relative to the first grinding tool during operation of the grinder (i.e. during grinding of coffee beans), wherein the grinder has at least one force generation device for applying a force F, which is preferably also adjustable during operation, to the first grinding tool or the second grinding tool, which is transmitted to the coffee beans, wherein the force F is directed in such a way that it presses the respective grinding tool to which the force F is applied in the direction of the respective other grinding tool. The force can be applied during operation, but also when the grinding tools are at a standstill or not in operation.

The grinder according to the invention serves or is designed for grinding coffee beans. It can be used as a stand-alone unit or integrated into a coffee machine, e.g. a fully automatic coffee machine.

The grinder comprises a first grinding tool and a second grinding tool.

The grinding tools form a grinding gap or define such a grinding gap from opposite sides. This grinding gap can be designed flat or increasingly towards the center, and preferably defines a plane, more preferably a plane of symmetry.

The second grinding tool can be rotated relative to the first grinding tool, in particular rotatably driven by a drive unit such as a motor.

The grinder also has at least one force generation device for applying a force F to the first grinding tool or second grinding tool, which is transmitted to the coffee beans to be ground. Thus, in addition to the weight of the grinding tools, a further force is added to the weight of the grinding tools, which can be adjusted during operation of the grinder and which is applied by the force generation device. In this process, the force F is directed in such a way that it presses the respective grinding tool to which the force F is applied, in particular axially in the direction of the respective other grinding tool. The force generation device thus presses the two grinding tools together and not, as is known from the prior art, away from each other.

The application of force virtually replaces the support of the grinding tool on an abutment. With an adjustable force, a product-specific optimum grinding degree can be achieved that remains largely constant even under changed process conditions.

It may be advantageously provided that a product-specific grinding degree is set by applying a force with an adjustable process force. In this respect, it can also be provided that when changing the type of coffee or the product type (e.g. from espresso to café crème), a product-specific setting of the grinding degree or changeover is automatically performed when the product is received from a fully automatic coffee machine in which the grinder is integrated. This setting of the grinding degree can be carried out extremely quickly with the invention, for example to change from a setting of the grinding degree for espresso to a setting of the grinding degree for café crème. Since the adjustment or changeover is very fast, a second grinder may even be unnecessary in a fully automatic coffee machine.

According to another aspect of the invention, there is provided a method for preparing coffee with a coffee machine, in particular with a fully automatic coffee machine, and with a grinder of the above type, in which coffee beans are ground with the grinder and in which coffee of a specific type is prepared in a brewing unit from the coffee beans and water. In one embodiment, the grinding degree is automatically adjusted or changed, depending on the type of coffee (for example espresso or café crème), before grinding, in the case of a change in the type of coffee, and further depending on the amount of water and the amount of ground coffee and optionally depending on additives such as milk.

During operation of the grinder, one of the two grinding tools can be at a standstill and the second of the two grinding tools can be rotatably operated by a drive unit, e.g. a motor. However, both grinding tools can also rotate, in particular in opposite directions to each other.

The force generation device can act upon both the first and second grinding tool, so that a more even distribution of force is achieved. However, in terms of design it is easier if the force generation device only acts upon one grinding tool, in particular the one at a standstill of the two grinding tools.

Furthermore, a force generation device can also act upon the first grinding tool and upon the second grinding tool.

In this case, according to one embodiment, it may be provided that the force generation device has at least one spring and a device for setting a pretensioning force of the spring, in particular in the form of a servomotor. This embodiment is particularly easy to implement in terms of design and is easily controllable and/or adjustable.

It should generally be noted that it is not primarily important which of the grinding tools (also referred to as "cutting tools" in the following), driven or stationary grinding tool, has a degree of freedom in the direction of the process force and is actively subjected to a force in this direction.

The force adjustment can be automatic (e.g. motorized) or manual (e.g. adjusting wheel). With motorized adjustment, a control loop is conceivable, wherein the grinding degree is changed if the last extraction times deviate from the target run-down time.

The constructive implementation of a force control can be realized in different ways. One possibility is the compression of a mechanical spring by a certain distance x with known force-displacement characteristic curve.

However, there are also other solutions for applying a defined force to one of the cutting tools. First of all, a pneumatic approach is conceivable here, wherein one grinding disc carrier can be actively pressed against the other with variable air pressure. A passive embodiment would be a gas pressure spring with a fixed force-displacement characteristic curve, wherein only a certain grinding degree would then be adjustable in the grinder. However, springs are also available with variable gas pressure.

Alternatively, however, it may also be provided that the force generation direction is based on a fluid operating principle. Since the distance between the grinding tools or cutting tools in the disc grinder only has to change slightly up to 0.2 mm depending on the process force during grinding, hydraulic solutions with fluids of higher compression modules are also possible to control the force. Even then, the system would have a damping effect during grinding. A rubber diaphragm can be used to apply force, which is filled with water via an adjustable pressure reducer. A hydraulic water system is available in coffee machines anyway and could be used to regulate the grinding degree.

Furthermore, the force generation device can also be advantageously based on an electromagnetic operating principle. In this solution, the movable cutting tool carrier is pressed against the fixed one due to a variable magnetic force. Since the magnetic force changes with increasing distance between armature and yoke, a balance of forces can also be achieved in an electromagnetic system during the grinding process between the cutting tools.

The grinder can also be designed in different ways, therefore advantageously as a disc or cone grinder.

The force generation device can have at least one pressure spring corresponding to the above designs, wherein the grinding gap extends over a plane E and wherein the pressure spring exerts an axial force perpendicularly to the plane E on the first and/or second grinding tool.

Several springs, especially pressure springs, can be provided. These can be arranged symmetrically around the axis of rotation, which is formed by the rotating grinding tool, to achieve an optimally distributed application of force.

A coil spring may be used as a pressure spring for the present application. However, springs or spring assemblies of other types can also be used.

The force generation device may have a device for setting a pretensioning force of the spring, in particular of the pressure spring, in particular in the form of a servomotor. This servomotor is preferably an actuator which is controlled and/or regulated by a control and/or evaluation unit.

The setting of the servomotor can be adjusted depending on a) the coffee beans, in particular the type of beans and their degree of roasting;
b) the temperature of the grinder; and/or
c) a degree of wear of the grinder.

For example, the type of coffee beans can be predetermined by manual adjustment or determined by the power of the motor driving the grinder or the grinding tools. In this case, the determined power is compared with a data record stored on the control and/or evaluation unit within the scope of an actual value/target value comparison with regard to the power depending on the force to be applied to achieve a certain grinding degree or with regard to a bean type depending on the force to be applied to achieve a certain grinding degree.

According to a further embodiment, it may be provided that when using a spring, the corresponding force-displacement characteristic curve is also specified as a data record, so that a specific adaptation of the spring force can be carried out by an actuator depending on the determined force to be applied.

In the same way, the temperature of the grinder or the degree of wear (number of grinding processes) can be determined and the force to be applied can be adjusted accordingly by a target value/actual value comparison.

It is also possible to combine the different sizes within the scope of a weighting, e.g. number of grinding processes with weighting according to bean type, in order to depict a more precise wear behavior.

The grinder can optionally be equipped with a temperature sensor to determine the thermal expansion of the grinder and to control the force generation device to adjust the grinding degree.

A method according to the invention for grinding coffee beans for the preparation of a caffeine-containing hot beverage, in particular by means of a grinder according to the invention, may comprise at least the following steps:

a) Picking up of coffee beans in a grinding gap between two grinding tools;
b) Applying an adjustable process force to at least one of the two grinding tools in the direction of the respective other grinding tool by a force generation device: and
c) Output of the ground coffee or the ground product with a defined grinding degree.

It is advantageous to adjust the magnitude of the process force depending on the type of coffee beans, the power of the grinder motor, the temperature of the grinder and/or the previous grinding passes.

When adjusting the magnitude of the process force, a desired degree of fineness of the ground product can also be considered. Corresponding data records according to degree of fineness or grinding degree can be stored on the control and/or evaluation unit.

During the grinding process, the cutting of the beans generates a force with which the cutting tools (grinding discs) are pressed apart. The stronger the force applied by the process force or counteracting force generation device, the finer the grinding degree. If there are no more beans, the disc-like grinding tools are clamped against each other with the contact pressure. Since the grinding tools are usually designed in such a way that they cannot get caught in each other, the grinder cannot fail.

However, in the event of an empty bean container, grinding noise and damage to the flat surface of the grinding discs could occur. In addition, undesirable heat effects can occur, which can have a negative effect on the quality of the coffee grinding. With cone grinders, the cutting tools could even block. To solve this problem, it may be advantageously provided for the grinder to have a stop, in particular an adjustable stop, to set a minimum grinding degree.

In this respect, it can be provided in particular that the axially movable tool part or the corresponding grinding tool is pressed against a stop. This end stop is adjustable before the grinder is put into operation and at the same time defines the minimum grinding degree to be produced. When force is applied, ideally there should only be a minimum gap between the cutting tools. If a greater contact pressure is subsequently specified than the process force during the grinding process, a ground product is produced with the fineness of this grinding disc gap.

In practice, the touching point (beginning of audible grinding noises) of grinding disc grinders is an indicator of the zero point of the grinder. However, this is highly dependent on the axial run-out of the grinding discs and the individual hearing sensation of the grinder fitter.

A suitable objective adjustment of the zero point can be carried out e.g. by an optional device to detect a certain electrical continuity of the lower and upper disc (electrical conductivity measurement). In conventional batches of grinders, grinding beans with respect to this reference point would still cause differences in the fineness distribution because the accuracy of the gap is directly related to the axial run-out tolerances of the discs. However, the use of this zero point definition for a force-controlled setting of the grinding degree has considerable advantages, because the subsequent fineness adjustment is only force-dependent and the stop is only used to prevent the touching point from being exceeded. Furthermore, such a construction leads to the avoidance of too finely adjusted grinders and overloading of the drive. A grinding degree that is too fine can lead to undesired long extraction times, in particular when producing filter coffee. Finally, this can also compensate for manufacturing tolerances in the design of the grinder.

In terms of design, an end stop can be realized by means of a threaded adapter of one of the grinding disc carriers. Eventually, the carrier can be rotated up to the touching point of the cutting tools and then be fixed in this position. Thus, a minimum fineness level can be designed to be adjustable so that the cutting tools cannot grind on each other.

The method according to the invention can also be further optimized by appropriate options. Therefore, it may be provided that a blockage of the cutting tools caused by impurities in the beans (pieces of wood, stones) can be released by removing the application of force. This is a simple and effective solution to the problem of cutting tool blockage.

The grinder can be designed as a disc or roller or cone grinder according to advantageous embodiments.

In one embodiment of the method it is provided that the adjustment of the magnitude of the process force is controlled by a control loop, wherein the control loop comprises the control and/or evaluation unit and at least one force measuring device having at least one force sensor. This has the advantage of enabling direct regulation of the grinder with regard to particle fineness.

For this purpose, the grinder has in a further embodiment at least one force measuring device having at least one force sensor, wherein the at least one force sensor is directly or indirectly connected to the grinding tool. Such a force sensor can be a low-cost, high-quality component available on the market. For this purpose, different embodiments such as hydraulic pressure sensors, load cells, etc. are suitable.

Another embodiment is designed in such a way that the at least one force sensor is connected to the control and/or evaluation unit and forms a measuring device of a control loop, which has the control and/or evaluation unit. The control and/or evaluation unit can have a computer, the programming of which can be extended by one or more control programs.

This results in the following advantages:

compensation of thermal expansion effects;

quick initial adjustment of a grinder (in particular when changing the grinding tool);

fineness adjustment during bean change; and direct regulation of the grinder with regard to particle fineness.

BRIEF DESCRIPTION OF THE DRAWINGS

In the following, the invention is described in more detail with reference to the drawings by means of an exemplary embodiment. The figures only serve to explain the invention in more detail and are not restrictive for the invention. Individual features described can also be transferred to further embodiment variants within the scope of general technical knowledge, wherein.

DETAILED DESCRIPTION

Figure 1:
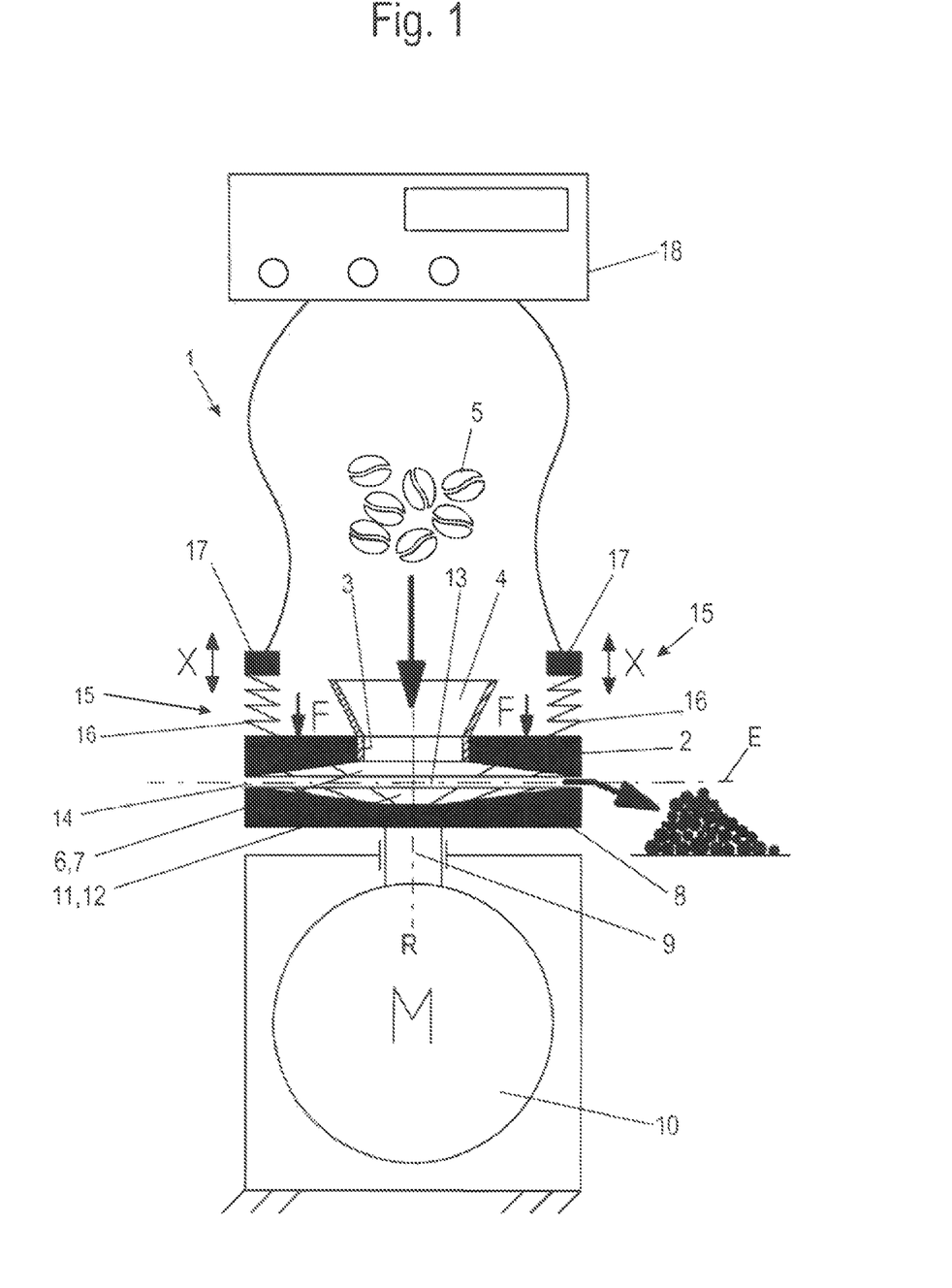
FIG. 1: is a schematic front view in section of an embodiment of a grinder according to the invention for grinding coffee beans.

FIG. 1 is a schematic front view in section of the device according to the invention, in the form of a grinder 1 for grinding coffee beans 5. Grinder 1 has a first grinding tool 2. The first grinding tool 2 is non-rotatably mounted in a housing not shown here. In this respect, the first grinding tool 2 is at a standstill during operation of grinder 1.

The first grinding tool 2 is designed here as a grinding disc and therefore has a cylindrical envelope geometry and a central opening 3. The grinding tool 2 can also be designed differently, e.g. as a grinding cone. The opening 3 can be penetrated by a feed hopper 4. Coffee beans 5 to be ground are fed to the device 1 through the feed hopper 4 and the opening 3. The grinder 1 can also be provided for grinding other semi-luxury foods or foodstuffs but is preferably intended for grinding coffee beans 5. The feed hopper 4 is advantageously designed to prevent undesirable bridge formation of the coffee beans 5 in the feed hopper 4.

The first grinding tool 2 has a conical recess 6 on its side facing away from the feed hopper 4. The recess 6 has at least one grinding edge 7.

The grinder 1 has a second grinding tool 8. The second grinding tool 8 is arranged coaxially to the first grinding tool 2 and below the first grinding tool 2. The term "below" refers to the drawing plane of FIG. 1. The second grinding tool 8 is rotatably mounted in a housing not shown here. In this respect, the second grinding tool 8 rotates during operation of grinding tool 1.

The second grinding tool 8 also has a cylindrical envelope geometry. The second grinding tool 8 can also be designed differently, e.g. as a grinding cone. The second grinding tool is rotatable relative to the first grinding tool. In this case, the second grinding tool 8 is non-rotatably connected to a drive shaft 9 of a motor 10 so that the second grinding tool 8 is set in rotation while the first grinding tool 2 stands still. This is advantageous, but not mandatory.

Alternatively, the first grinding tool can be rotatable or rotated during operation while the second grinding tool 8 stands still. It is also possible that both grinding tools can be rotated, e.g. in opposite directions of rotation and/or at different speeds, so that there is always a relative movement between the two grinding tools 2, 8. Alternatively, a shaftless direct drive is also possible, in which one of the grinding tools 2, 8 is the rotor of the motor 10, or an indirect drive, in which the motor 10 acts upon one of the grinding tools 2, 8 via a transmission. The second grinding tool 8 has a conical recess 11 on its side facing away from the motor 10. The recess 11 has at least one grinding edge 12.

The conical recess 6 of the first grinding tool 2 and the conical recess 11 of the second grinding tool 8 thus form a kind of double conical grinding chamber 13, which opens at its outer circumference into a grinding gap 14. A collecting device (not shown here) can be connected to the grinding gap 14, which collects the coffee beans, preferably coffee powder, emerging from the grinding gap 14 and feeds the powder into an extraction process.

The grinder 1 has at least one force generation device 15. In this case, the force generation device 15 acts upon the first grinding tool 2, which means that a respective force F acts continuously, i.e. during operation while one or both grinding tools are rotating, upon coffee beans located between the first grinding tool 2 and the second grinding tool 8. This is advantageous, but not mandatory. The force generation device 15 can also act upon the second rotatable grinding tool 8 or upon both grinding tools 2, 8.

Here, the force generation device 15 comprises two pressure springs 16, which can be pretensioned by a corresponding device 17, for example by a servomotor, by a variable pretension path X, so that the respective force F, which acts upon the first grinding disc 2 and thus, during operation upon the coffee beans, can be changed or adjusted in its amount.

The force generation device 15 can also be designed differently than shown in FIG. 1. In this case, the force effect is essential, wherein the amount of force F is preferably variable or adjustable. In this case, the force generation device 15 can also be designed in such a way that the amount of force F is controlled automatically and/or infinitely variable depending on the higher-level operating parameters of a coffee machine.

This makes it advantageously possible to carry out a defined presetting of a grinding degree C., since the force F correlates with the grinding degree C., i.e. the size distribution of the ground product particles, characterized by the particle size of the 50% median of the ground coffee, which will be explained below.

In addition, the force acting upon the coffee beans by the grinder 1 can be set advantageously by the force generation device, depending on the coffee beans 5 to be ground and the desired grinding degree C. Preferably, data records regarding the grinding degree C. and the bean type and the force to be generated by the force generation device are stored on a data memory of a control and/or evaluation unit 18 for controlling a coffee machine and in particular the grinder 1. The aforementioned control and/or evaluation unit 18 can be assigned to the grinder 1 or be part of a coffee machine, e.g. a fully automatic coffee machine.

A setting of the grinding degree C. can thus be adjusted to match the specific bean (e.g. hard/heavily roasted beans vs. less heavily roasted café crème beans). See also FIG. 3 in this respect.

Alternatively, the type of beans can also be determined by the difference in power of the grinding efficiency by means of which the motor 10 is operated.

Furthermore, the force-controlled adjustment of the grinding degree C. allows a permanent reproducibility of the grinding degree C. even in case of grinding tool wear. For this purpose, a characteristic curve for wear over time can be stored for each bean type. The number of grinding processes can be weighted differently depending on the bean type used. Thus, for example, after 100 grinding processes of a "hard" bean type, a readjustment can be made by means of the device 17.

Likewise, the force-controlled setting of the grinding degree C. can be used advantageously to compensate for thermal expansion effects, in particular of the grinding tools 2 and 8. For this purpose, a temperature sensor 23 (see FIG. 5) can detect the heat of the coffee beans as they leave the grinder 1, represented by the double arrow—dashed line between the arrow at the output of the grinder and the temperature sensor 23, which has an output leading to the control and/or evaluation unit 18 which, taking into account the coefficients of thermal expansion of the material of the grinding tools, accordingly adjusts the force of the force generation device 15, in particular the pretensioning force of the pressure springs 16.

Furthermore, manufacturing inaccuracies of the grinding tools 2, 8, such as axial run-out tolerances of the grinding tools 2, 8 have a significantly lower disturbing influence on the "grinding degree zero setting" of grinder 1 than in other grinding devices.

Consequently, there are advantageously lower fluctuations of a grinding efficiency O of the grinder 1 and the generated grinding degree C. during operation of the grinder 1.

The grinder 1 described here opens up the possibility of changing the grinding degree C. of coffee beans, including espresso beans, in a force-controlled manner via the force generation device 15. The inventive idea is based on a relationship between the force F acting upon the grinding tools 2, 8 and the resulting distribution of the particle size of the coffee beans. The narrower the grinding gap 14 is, the finer is the ground product produced and the greater the reaction force with negative sign −F with which the grinding tools 2, 8 are pressed apart. In embodiments according to the prior art, this force is absorbed by the grinding housing via the upper grinding tool.

Figure 2:
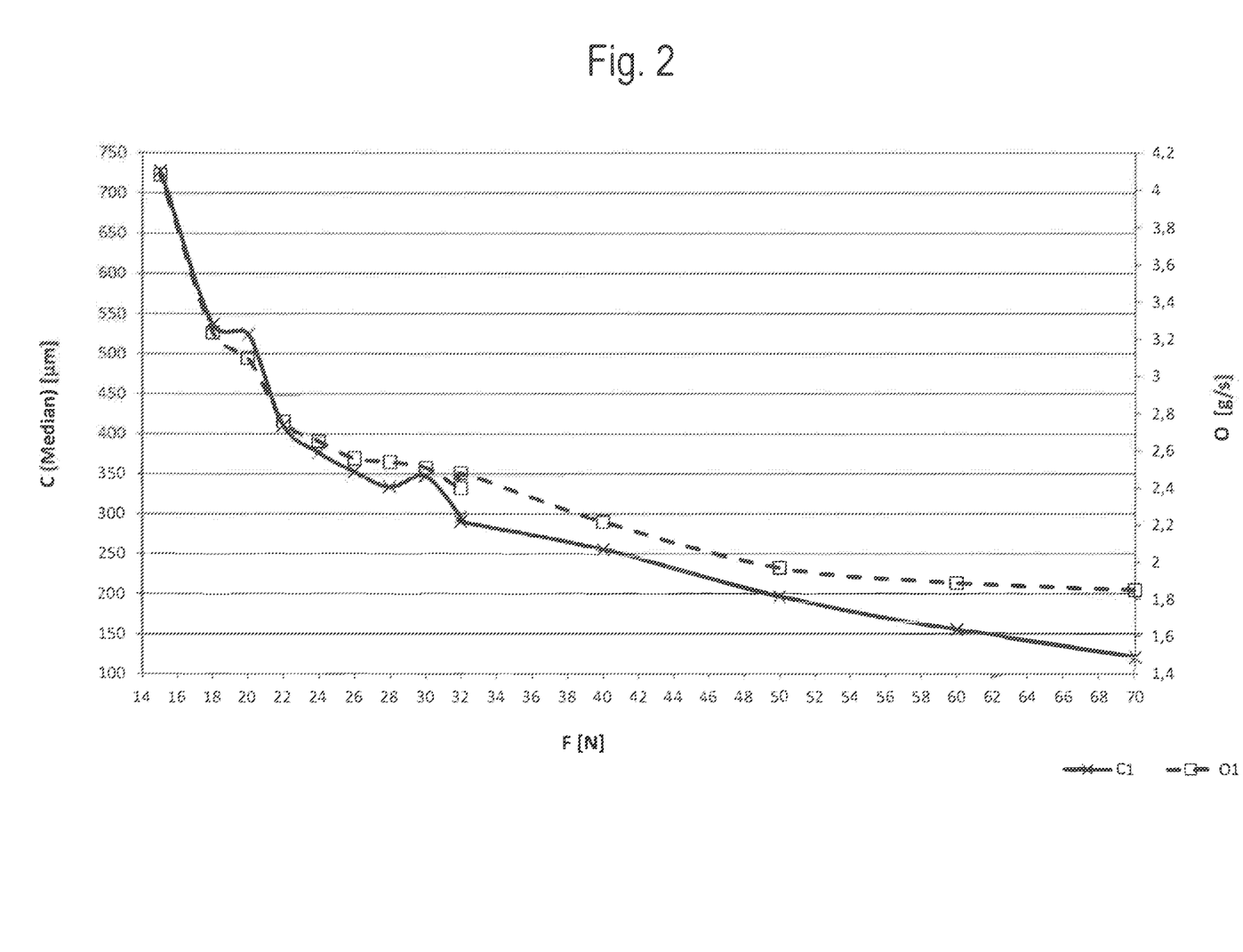
FIG. 2: is a diagram showing the results of a series of grinding tests.

The relationship between a fixed geometry of the grinding tools 2, 8 and the resulting relationship between the amount of force and the grinding degree C. can be determined empirically (see FIG. 2). The knowledge gained from this can be used to permanently and precisely adjust the grinding degree C. of the device 1. If the magnitudes of the forces are known, they can be specified in certain gradations in order to produce a specific grinding degree C. (see also FIG. 3).

Figure 3:
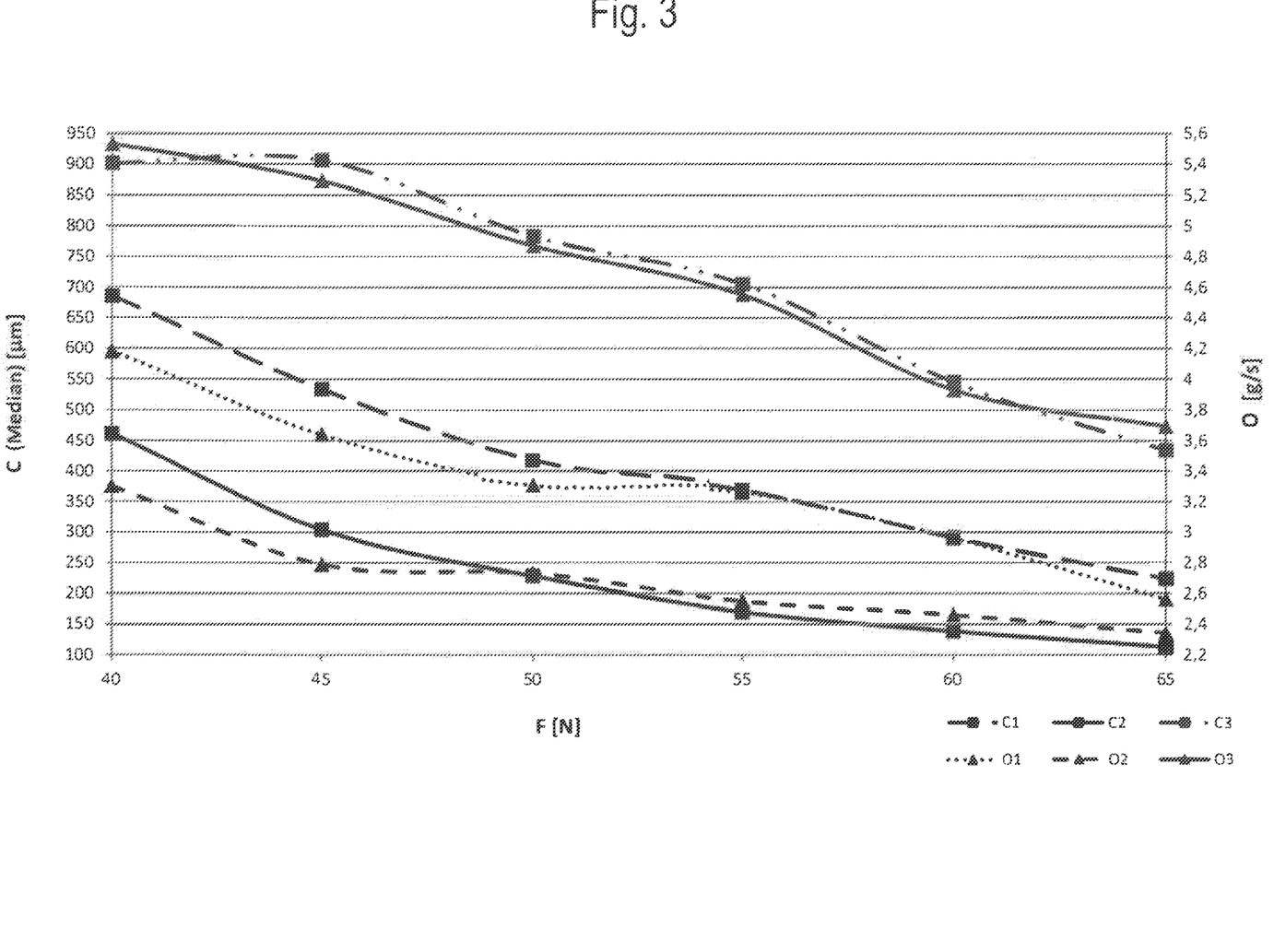
FIG. 3: is another diagram showing the results of a series of grinding tests.

FIG. 3 shows the results of a grinding test series. In this case, the upper grinding disc 2 was subjected to different forces F and then three grinds were performed with the Bacio Nero bean. The coffee powder was then measured with a particle measuring device (measurement based on laser diffraction). The different grinding samples correspond to the three characteristic curves fineness measurement 1-3, wherein the median of the fineness distribution (grinding degree C.) is used as characteristic in each case.

At the same time the grinding efficiency O of the device 1 was noted, i.e. the output grinding quantity of the device 1 per second. The device 1 was controlled by the motor 10 with power supply 230V, 50 Hz for 5 s each. FIG. 3 considers the influence of the amount of force F on the grinding degree C. and the grinding efficiency O when grinding different beans. The bean types Bacio Nero, La Tazza Verde (Melitta) and a reference type were ground. In this case again, grinding efficiency O and grinding degree C. were recorded at different amounts of force F acting upon the grinding tools 2, 8.

Experiments have therefore shown that there is a good correlation between grinding efficiency O and grinding degree C. of a bean, provided that the production accuracy of the grinding tools 2, 8 is within a certain tolerance (see FIG. 2 and FIG. 3). From the grinding efficiency O of different grinders, it is therefore possible to draw conclusions about the produced grinding degree C. with a high degree of accuracy, provided that the behavior of the grinding tools 2, 8 is known.

Under these conditions, a bean-specific force F can be inferred, with which a desired particle size distribution or a desired grinding degree C. can be achieved. With the help of a database, in which the behavior of a reference roast and reference bean is stored, a control of the force F can then be performed in order to set the desired particle size distribution or the desired grinding degree C. for the current roast and bean. As soon as the grinding efficiency O changes to a corresponding force F, because another bean or roast is used or the batch of a roast or bean type can be ground differently, the system regulates independently by a factor that depends on the grinding degree. This means that the force F is adjusted in order to obtain a desired particle size distribution or a desired grinding degree C.

Furthermore, for presetting a fully automatic coffee machine, a grinder-specific determination of the relationship between grinding efficiency O and grinding degree C. is conceivable. In this way, increased accuracy can be generated for a specific grinder and the roast or bean type to be ground in it, in order to set a required grinding degree C. at a specified amount of force F.

The grinding efficiency O of device 1 can be determined by means of already known methods:

An indirect possibility is to use a cake height of the coffee powder in the extraction process at a given contact pressure to infer the weight of the coffee powder provided for the extraction process. A piston coffee machine offers this possibility due to the already existing brewing unit. Since the control time of the grinder is specified, the grinding efficiency O can then be inferred.

A direct possibility is to weigh out the coffee powder. This can be automated by grinding in a set drawer and controlling it with a load cell.

Another possible application of a force-controlled setting of the grinding degree C. is the combination of the device 1 with a regulation of the contact time between brewing water and coffee powder. To produce a constant beverage quality with a constant proportion of dissolved flavorings, a constant quantity of coffee powder with identical grinding degree C. must be passed through by a specified amount of water within a certain time. Other basic conditions such as water temperature, contact pressure and brewing pressure must also remain as constant as possible during the brewing process so that the swelling behavior of the coffee is comparable and the contact time between the brewing water and the coffee powder remains identical.

Figure 4:
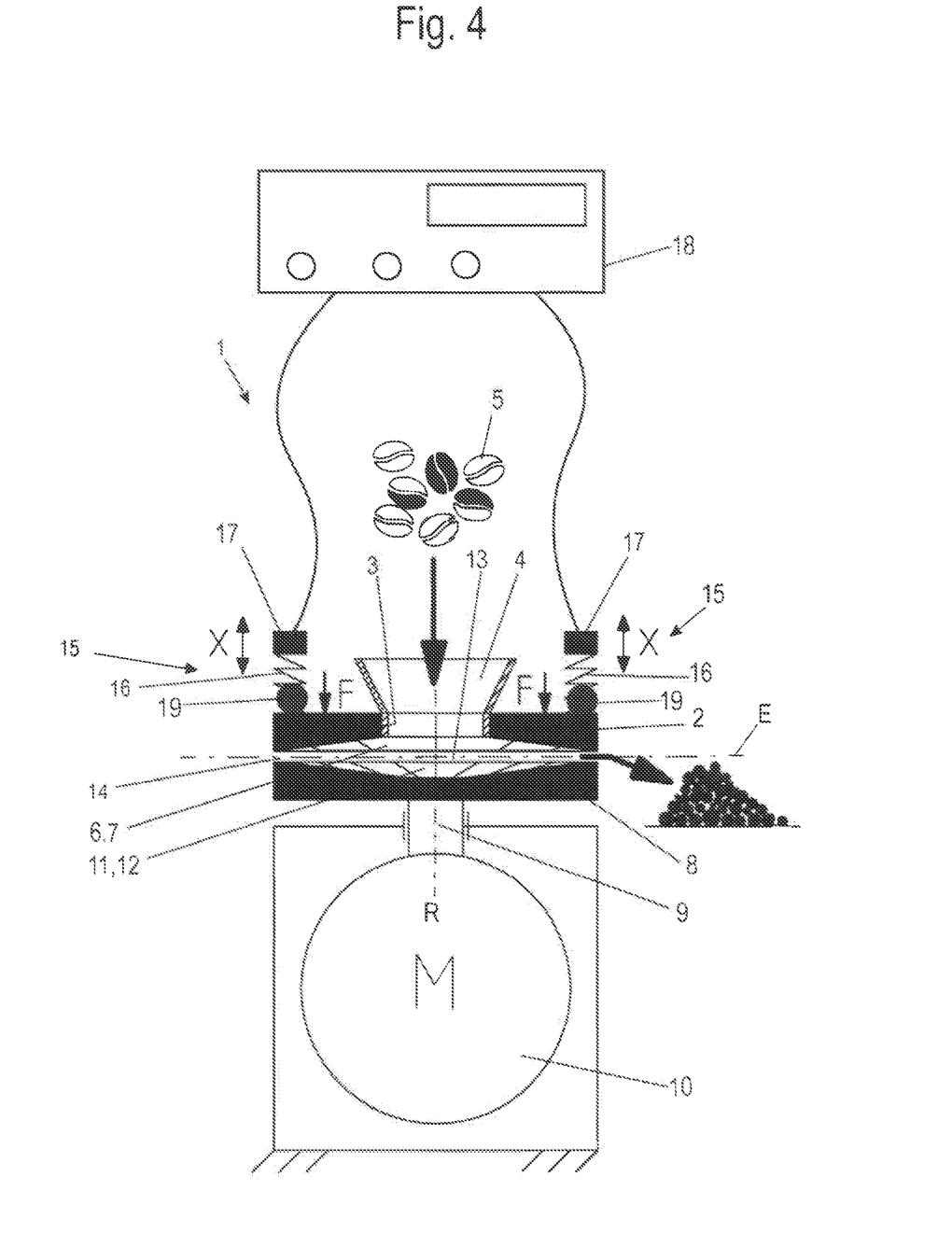
FIG. 4: is a schematic front view in section of an embodiment of a grinder according to the invention for grinding coffee beans.

A further embodiment of the grinder 1 is shown in FIG. 4 which, in comparison to FIG. 1, shows a rolling element 19 arranged between the grinding tool 2 and the pressure springs 16. It can also be a rolling bearing, e.g. a ball bearing or a needle bearing with a rolling element cage, wherein the pressure spring rests on the rolling element cage. This can extend coaxially to the feed hopper 4. The rolling element bearing allows rotation of the grinding tool 2 without the connection point of the respective pressure spring rotating with it.

This means that force can also be applied to a rotating tool element and, for example, force can also be applied to both tool elements.

Figure 5:
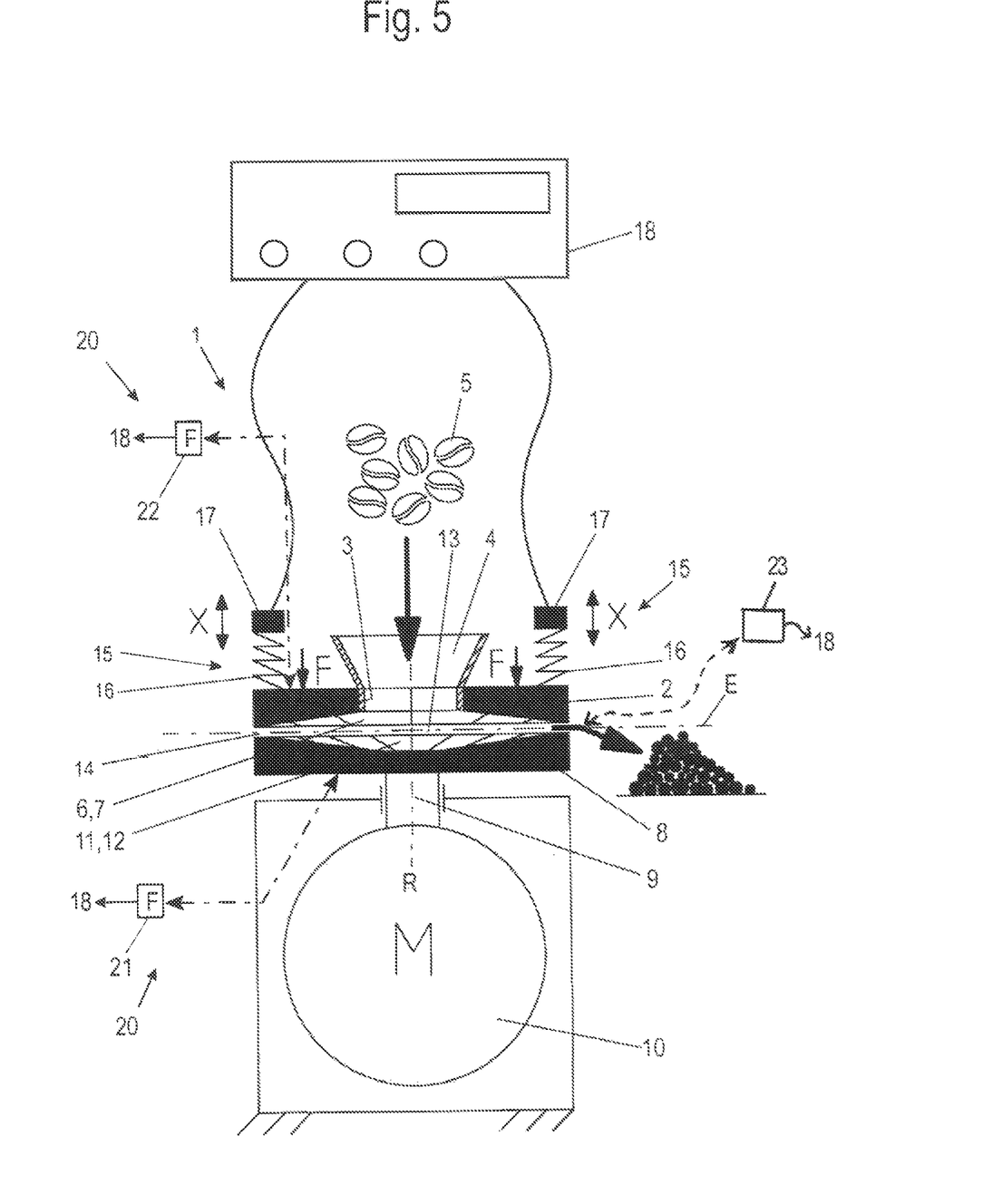
FIG. 5: is the front view of the grinder according to FIG. 1 with a force sensor device.

FIG. 5 shows the front view of the grinder according to the invention and FIG. 1 with the addition of one or more force sensor devices 20 arranged in cooperation with one of the grinding tools 2, 8. In this case, two sensor devices 20 are shown. A first force sensor 21 is in interaction with the grinding tool 8 at a standstill, whereas a second force sensor 22 is in interaction with the first grinding tool 2. Each force sensor 21, 22 can be directly or indirectly connected to the corresponding grinding tool 2, 8.

The force sensors 21, 22 can, for example, be a pressure sensor (e.g. a load cell or a hydraulic pressure sensor), which respectively records the force during a grinding process by direct or indirect measurement.

Each force measuring device 20 is connected to the control and/or evaluation unit 18, as shown by the arrows in FIG. 5, and forms a measuring device of a control loop. The control and/or evaluation unit 18 has at least one target value/actual value comparator and a manipulated variable generator, which is coupled to an electrical fineness adjustment of the grinder 1, which is not shown, but can easily be imagined.

Since the axial force/fineness ratio of different beans in a grinder can be determined empirically, the grinder 1 is able to electrically set/adjust desired grinding degrees and to regulate them against disturbing factors (temperature, bean change, grinding disc exchange) with this control loop.

This results in the following advantages:
1. compensation of thermal expansion effects;
2. quick initial adjustment of a grinder (in particular when changing the grinding tool);
3. fineness adjustment during bean change; and
4. direct regulation of the grinder 1 with regard to particle fineness (see indirect regulation via extraction time of the coffee cake).

The invention claimed is:

1. A grinder for grinding coffee beans, comprising:
a first grinding tool and a second grinding tool arranged relative to one another to form a grinding gap and to be rotatable relative to one another during operation of the grinder for grinding the coffee beans in the grinding gap;
at least one force generation device arranged for applying a force which is adjustable during operation of the grinder to at least one of the first grinding tool and the second grinding tool, in which the force is transmittable to the coffee beans, wherein the force is directed so that it presses the respective grinding tool to which the force is applied in a direction of the respective other grinding tool; and
a temperature sensor for determining a thermal expansion of the grinder, wherein the force generation device is controlled as a function of the thermal expansion.

2. The grinder according to claim 1, further comprising a drive unit arranged to rotatably drive one of the two grinding tools while the second of the two grinding tools is arranged to stand still.

3. The grinder according to claim 1, wherein the force generation device acts upon at least one of the first and the second grinding tool.

4. The grinder according to claim 1, wherein the force generation device is arranged to act in each case upon the first grinding tool and upon the second grinding tool.

5. The grinder according to claim 1, wherein the grinder comprises one of a disc, roller and cone grinder.

6. The grinder according to claim 1, wherein the force generation device includes a pressure spring, wherein the grinding gap extends across a plane and the spring exerts an axial force perpendicularly to the plane on at least one of the first and second grinding tool.

7. The grinder according to claim 1, wherein the force generation device comprises at least one spring and a device for setting a pre-tensioning force of the spring.

8. The grinder according to claim 1, wherein the force generation device is operable based on a pneumatic operating principle.

9. The grinder according to claim 1, wherein the force generation device is operable based on a fluid operating principle.

10. The grinder according to claim 1, wherein the force generation device is operable based on an electromagnetic operating principle.

11. The grinder according to claim 1, further comprising a control unit, wherein the grinder is operable for setting a pre-tensioning force of the spring by the control unit as a function of at least one of:
a) the type of coffee beans and their degree of roasting;
b) the temperature of the grinder; and
c) a degree of wear of the grinder.

12. The grinder according to claim 1, further including an adjustable stop arranged for setting a minimum grinding degree.

13. A coffee machine, including the grinder according to claim 1.

14. A method for grinding the coffee beans for preparation of a hot coffee beverage by the grinder according to claim 1, comprising the following steps:
a) placing the coffee beans in the grinding gap between the first and the second grinding tools;
b) applying the adjustable force during the operation, to at least one of the first and the second grinding tools in the direction of the respective other grinding tool by the force generation device; and
c) outputting ground coffee beans with a defined grinding degree.

15. The method according to claim 14, further including setting a magnitude of the adjustable force as a function of at least one of a type of the coffee beans, a power of a motor of the grinder, a temperature of the grinder and a number of previous grinding passes.

16. The method according to claim 15, wherein the setting of the magnitude includes taking into account a desired grinding degree of the ground product.

17. The method according to claim 16, wherein the setting of the magnitude includes setting a product-specific grinding degree on a fully automatic coffee machine by applying the adjustable force.

18. The method according to claim 14, including resolving a blockage of the grinding tools caused by impurities, such as pieces of wood and stones in the beans, by discontinuing the applying the adjustable force.

19. A method for preparing coffee with a fully automatic coffee machine utilizing the grinder of claim 1, including: grinding the coffee beans with the grinder to produce ground coffee beans and preparing coffee of a specific type in a brewing unit from the ground coffee beans and water; and automatically setting or changing over a grinding degree depending on the type of the coffee before grinding when the type of coffee is changed.

20. The method according to claim 19, wherein the setting of the grinding degree produced by the adjustable force includes controlling by a control loop that includes a control and/or an evaluation unit and at least one force measuring device having at least one force sensor for sensing a magnitudes of the adjustable force.

21. A grinder for grinding coffee beans, comprising:
a first grinding tool and a second grinding tool arranged relative to one another to form a grinding gap and to be rotatable relative to one another during operation of the grinder for grinding the coffee beans in the grinding gap;
at least one force generation device arranged for applying a force which is adjustable during operation of the grinder to at least one of the first grinding tool and the second grinding tool, in which the force is transmittable to the coffee beans, wherein the force is directed so that it presses the respective grinding tool to which the force is applied in a direction of the respective other grinding tool; and
at least one force measuring device having at least one force sensor connected directly or indirectly to at least one of the first and second grinding tools.

22. The grinder according to claim 21, further including a control loop that includes a control and/or an evaluation unit and the at least one force measuring device having at least one force sensor connected to the control and/or the evaluation unit.

* * * * *